(12) United States Patent
Kim et al.

(10) Patent No.: US 6,230,578 B1
(45) Date of Patent: May 15, 2001

(54) VARIABLE FACE WIDTH GEARING

(75) Inventors: Hanjoon Alex Kim; Mark Anderson Allen, both of Pittsburgh, PA (US)

(73) Assignee: Axicon Technologies, Inc., Pittsburgh, PA (US)

( * ) Notice: Subject to any disclaimer, the term of this patent is extended or adjusted under 35 U.S.C. 154(b) by 0 days.

(21) Appl. No.: 09/303,243

(22) Filed: Apr. 30, 1999

(51) Int. Cl.$^7$ ................................................. F16H 55/08
(52) U.S. Cl. ................................................................ 74/462
(58) Field of Search ....................................... 74/461, 462

(56) References Cited

U.S. PATENT DOCUMENTS

| | | |
|---|---|---|
| Re. 28,696 | 1/1976 | Rouverol . |
| Re. 29,115 | 1/1977 | Rouverol . |
| 1,194,904 | 8/1916 | Wagner . |
| 1,613,702 | 1/1927 | Hammar . |
| 1,690,931 | 11/1928 | Hammar . |
| 1,766,153 | 6/1930 | Trbojevich . |
| 2,453,656 | 11/1948 | Bullard, III . |
| 2,764,034 * | 9/1956 | Hotine ................................. 74/440 |
| 3,184,988 | 5/1965 | Osplack et al. . |
| 3,206,997 | 9/1965 | Hardy . |
| 3,881,364 | 5/1975 | Rouverol . |
| 3,937,098 | 2/1976 | Rouverol . |
| 3,938,865 | 2/1976 | Rouverol . |
| 3,946,621 | 3/1976 | Rouverol . |
| 3,982,444 | 9/1976 | Rouverol . |
| 3,982,445 | 9/1976 | Rouverol . |
| 4,108,017 | 8/1978 | Rouverol . |
| 4,140,026 | 2/1979 | Rouverol . |
| 4,149,431 | 4/1979 | Rouverol . |
| 4,259,875 | 4/1981 | Rouverol . |
| 4,276,785 | 7/1981 | Rouverol . |
| 4,324,441 | 4/1982 | Rouverol . |
| 4,464,138 | 8/1984 | Decker . |
| 4,589,300 | 5/1986 | Rouverol . |
| 4,644,814 | 2/1987 | Rouverol . |
| 4,651,588 | 3/1987 | Rouverol . |
| 4,899,609 | 2/1990 | Nagata . |
| 5,083,474 | 1/1992 | Rouverol . |
| 5,271,289 | 12/1993 | Baxter, Jr. . |
| 5,315,790 | 5/1994 | Kish et al. . |
| 5,341,699 | 8/1994 | Rouverol . |
| 5,485,761 | 1/1996 | Rouverol . |
| 5,802,921 | 9/1998 | Rouverol . |
| 5,946,975 * | 9/1999 | Yun ........................................ 74/462 |

FOREIGN PATENT DOCUMENTS 741376   11/1955   (GB) .

OTHER PUBLICATIONS

Product Brochure, Stealth® Planetary Gearhead, Bayside Precision Gearheads; two pages.

* cited by examiner

*Primary Examiner*—Allan D. Herrmann
(74) *Attorney, Agent, or Firm*—Reed Smith LLP

(57) ABSTRACT

A form of gearing having teeth with different face widths along the tooth height and a method thereof of designing and manufacturing. Different gear tooth face widths are introduced along the tooth height to alter the tooth stiffness characteristic to provide a pair of gears with reduced mesh stiffness variation. The use of variable face widths along the tooth height changes both the geometric properties of the tooth and the load distribution/concentration to reduce the self-excited component of dynamic load, in effect reducing gear noise and increasing power density.

32 Claims, 5 Drawing Sheets

VARIABLE FACE WIDTH GEARING

I. BACKGROUND OF THE INVENTION

A. Field of the Invention

This invention relates to the design of gear teeth. Specifically, it relates to gearing having characteristics that reduce the self-excited component of dynamic load. As a consequence, this gearing is quieter and exhibits greater power density than conventional gearing. The invention discloses a gear form that achieves these desirable performance characteristics in a way that is less costly and, in many commonly encountered circumstances, more robust than previously disclosed gear forms.

B. Related Art

It is well known in the art that, as a pair of gears rotates, the effective stiffness of the gear mesh varies as a function of mesh cycle position. This periodic variation in mesh stiffness gives rise to what has been referred to in the art as the "dynamic increment" of load. In addition to serving as the primary excitation for gear noise, this "dynamic increment" serves to reduce effective torque capacity. Any means that can be employed to reduce this self-excited component of dynamic load will have the effect of reducing gear noise and increasing power density.

U.S. Pat. Nos. 5,083,474, 5,341,699 and 5,485,761, disclose an elastic means for reducing mesh stiffness variation that is effective at all operating loads. This desirable mesh stiffness characteristic is achieved by introducing different forms and amounts of lead crowning at different positions along the length of the gear tooth. The introduction of this "differential crowning" serves to decrease the elastic stiffness of gear teeth in the portion of the mesh cycle having the greater number of tooth pairs in contact. While effective in reducing mesh stiffness variation, this approach, which frequently concentrates loads over a small area, can lead to excessive contact pressures and stresses, potentially compromising performance in high-speed or high-load applications. Furthermore, the manufacture of gears having different forms and amounts of crowning at different roll angle positions often requires special cutting tools and/or manufacturing processes.

U.S. Pat. No. 5,315,790 discloses a method of using finite element analysis to calculate a tooth topology that compensates for load-induced tooth deflections. Similar in effect to conventional tip relief, and unlike the means disclosed in the present application, this type of modification uses initial separation to reduce mesh stiffness variation; as a consequence, it is effective only in the vicinity of a particular design load. In addition, this particular type of modification can be difficult and expensive to produce. U.S. Pat. No. 5,802,921 discloses the use of "liminal cross-modification" for reducing dynamic loading and tooth impact in helical and spiral bevel gearing only. Although this approach does not lead to an increase in contact pressure, the means used to achieve this end are markedly different from and typically more expensive than those prescribed by the present invention.

II. SUMMARY OF THE INVENTION

An advantage of the present invention is to provide a novel shape of gear teeth that reduces the self-excited component of dynamic load in a way that is less costly and more robust than previously disclosed gear forms. Specifically, what is disclosed is the use of different gear tooth face widths along the tooth height to elastically reduce mesh stiffness variation.

This invention embodies the use of different face widths along the tooth height to change both the geometric properties of the tooth and the load distribution or concentration. The change in geometric properties directly affects the bending stiffness and the change in load distribution directly affects the compressive stiffness of the tooth pair. In this manner, a favorable proportion of a change in bending stiffness and a change in compressive stiffness can be used to reduce mesh stiffness variation. The advantage of this is evident by contrasting with U.S. Pat. Nos. 5,083,474, 5,341,699 and 5,485,761. Due to the effective use of the bending component of tooth pair stiffness, gears embodying this invention will exhibit lower compressive pressures and stresses than those embodying the above referenced patents, while achieving a comparable mesh stiffness characteristic. Therefore, in high speed and high load applications, the reduced compressive pressures and stresses will be advantageous.

In contrast to U.S. Pat. Nos. 5,083,474, 5,341,699 and 5,485,761, the use of no crowning or a constant crowning curve throughout the tooth height may not provide an ideal solution at all loads. However, compared to those types of modifications that use initial separation to reduce mesh stiffness variation such as that of U.S. Pat. No. 5,315,790, the herein disclosed invention still affords a significant performance improvement across a range of loads by elastically modifying the tooth pair stiffness characteristic.

While the discussion has concentrated on reducing mesh stiffness variation through a mesh cycle, another advantage of this form of gearing is the ability to reduce weight without compromising gear noise or power density. As such, a method of choosing the appropriate face width at specific roll angles to achieve numerous design objectives is disclosed.

Another advantage of gears embodying this invention, specifically in contrast with known gear forms requiring topological modifications such as those of the above referenced patents, is the simplicity of manufacture. That is, gears embodying the present invention can be manufactured using conventional machines with conventional tools by any process currently used to make gears. The only difference from a manufacturing viewpoint is the blank design and fabrication, which can be carried out using any conventional lathe with conventional tooling. This can represent a significant cost savings in comparison with those gear forms requiring topological modifications.

These and other advantages of the present invention will be clarified in the detailed description of the preferred embodiments taken together with the attached figures wherein like reference numerals represent like elements throughout.

III. BRIEF DESCRIPTION OF THE DRAWINGS

IV. DESCRIPTION OF THE PREFERRED EMBODIMENTS

Figure 1:
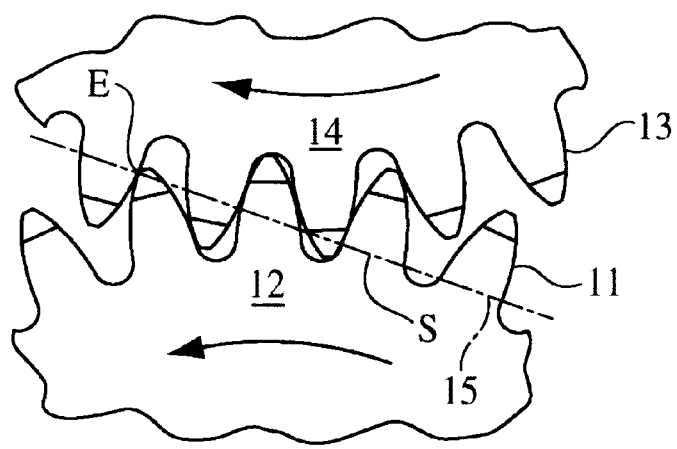
FIG. 1 is a partial section of a pair of mating gears embodying the invention showing transverse tooth profiles.

In detail and referring to the drawings, FIG. 1 is a partial transverse section through a pair of gears 12, 14 embodying this invention. It should be clear to those of ordinary skill in the art that the gears embodying this invention utilize the standard parts of a gear and that standard gear action applies. Teeth 11 on gear 12 and teeth 13 on gear 14 make contact along a pressure line 15 that contains the path of contact extending from Point S and ending at Point E. Accordingly, as the gears rotate through a mesh cycle, the number of pairs of teeth in contact changes, which brings about a large variation in the effective mesh stiffness of conventional gears. It is one advantage of the current invention to minimize this variation in mesh stiffness, which will have the effect of reducing gear noise and increasing power density.

Figure 2:
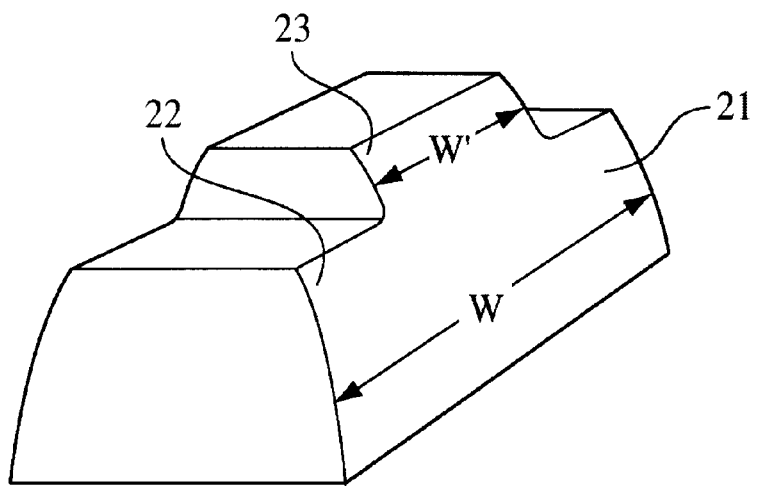
FIG. 2 is a perspective view of a gear tooth embodying the invention.

The current invention embodies choosing different face widths at different roll angles or tooth heights of a gear tooth to elastically modify the tooth stiffness. For a pair of gears in mesh, two teeth come in contact to provide a tooth pair stiffness characteristic. Each tooth face width can be modified to affect the tooth pair stiffness characteristic, which in turn can be chosen to reduce mesh stiffness variation. FIG. 2 shows a sample tooth 21 of a gear embodying the current invention. The feature that distinguishes the current invention from the prior art is the change in face width at certain heights, or roll angles, along the height of the tooth. In this example, the face width is reduced from W to W' at the roll angles ranging from 22 to 23.

In specific, the change in face width alters both the load distribution and concentration and the geometric properties of the gear tooth. The fact that changing the load distribution and concentration affects the mesh stiffness characteristic is known in the art. This invention entails a further change in the geometric properties of the gear tooth in order to affect the tooth pair stiffness characteristic. Those of ordinary skill in the art can understand this effect by examining the equations for the deflection of a cantilevered tapered plate with varying cross-sections. By either the strain energy method or other method to calculate plate deflections due to bending, it is evident that a key parameter required is the moment of inertia as a function of critical length. The moment of inertia is a property of the cross-sectional area of a solid body. Thus, for a gear tooth, varying the face width will change the moment of inertia, which will also change the bending stiffness characteristic of the tooth.

The advantage of modifying the moment of inertia to affect the bending stiffness is to reduce the magnitude of change required in load concentration to achieve a reduction in mesh stiffness variation comparable to that achieved by the previously referenced patents. The reduced concentration of loading leads to lower compressive stresses in comparison to the previously referenced patents. As stated above, this can be a significant advantage in certain high speed or high load applications.

It should be noted that because the modifications described herein change mesh stiffness without using initial separation, the modified stiffness characteristic is substantially independent of load. However, tooth pair deflection for this invention is not perfectly linear with respect to load. That is, when the load is doubled, the deflection is not quite doubled, increasing by a factor that is typically in the range 1.90 to 1.95. Gears in accordance with U.S. Pat. Nos. 5,083,474, 5,341,699 and 5,485,761 account for this non-linearity by using a multi-section crowning curve at specific roll angles, the shape of the curve being designed to afford a stiffness characteristic that can be fully optimized across all loads.

Figure 3:
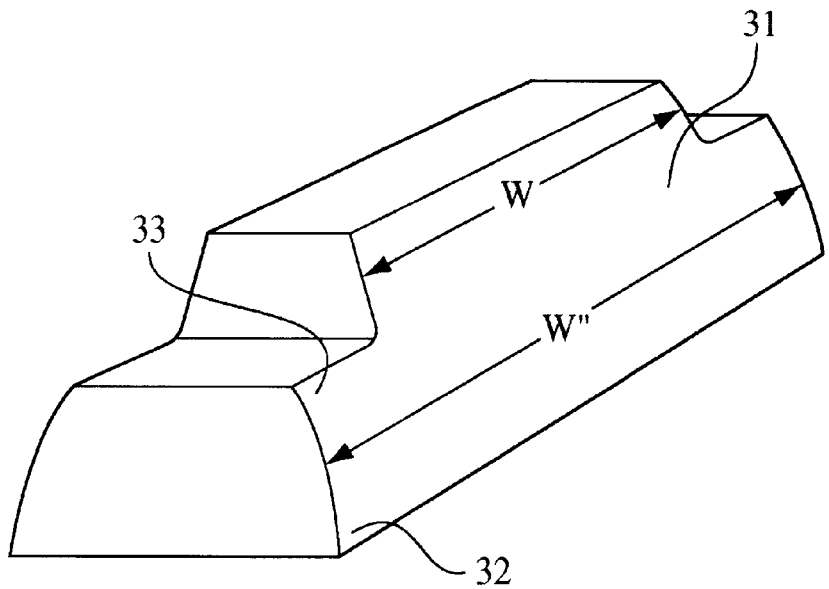
FIGS. 3 and 3A are perspective views of a gear tooth embodying additional embodiments of the invention.
Figure 3A:
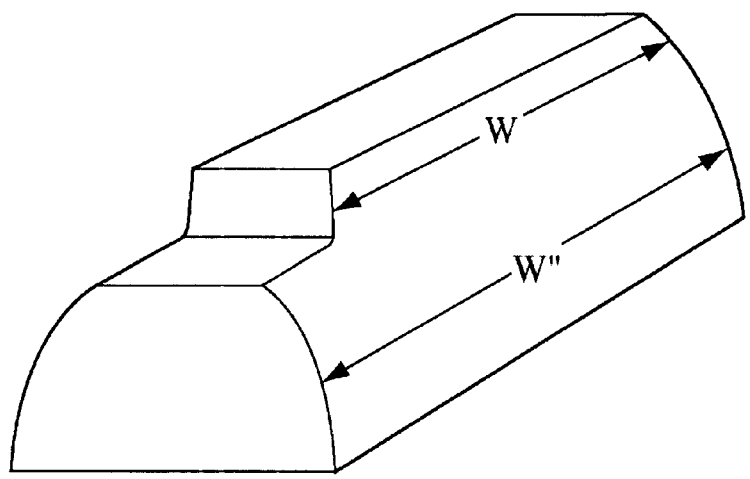

Another embodiment of this invention uses different face widths at certain roll angles in order to increase the elastic stiffness of the gear mesh in the portion of the mesh cycle having the lesser number of tooth pairs in contact. FIG. 3 illustrates this embodiment where the distinguishing feature is that the face width is increased from W to W" at the roll angles ranging from 33 to 32. By increasing the width at these roll angles, it is evident to one skilled in the art that mesh stiffness has been increased in these areas, leading to less deflection as compared with gears known in the art. As such, compressive stresses would be reduced, albeit with a face width that is larger than that of a conventional gear. FIG. 3A further shows another embodiment of the invention wherein the centerline of a first face width W is different from the centerline of a second face width W". Factors such as required clearance or space efficiency may make such an embodiment beneficial.

As shown above, FIGS. 2 and 3 illustrate two embodiments of the current invention, both of which use the same general principle: the face width is altered at certain roll angles to produce a desired tooth pair stiffness characteristic. Accordingly, there is a multitude of gear tooth forms that can be produced following this same general principle. Some, but not all, examples are shown in FIGS. 4A–4D. In addition, since there are two members of a gear pair, a wide variety of combinations can exist, including having a gear with teeth embodying the current invention mating with a conventional gear.

Figure 4A:
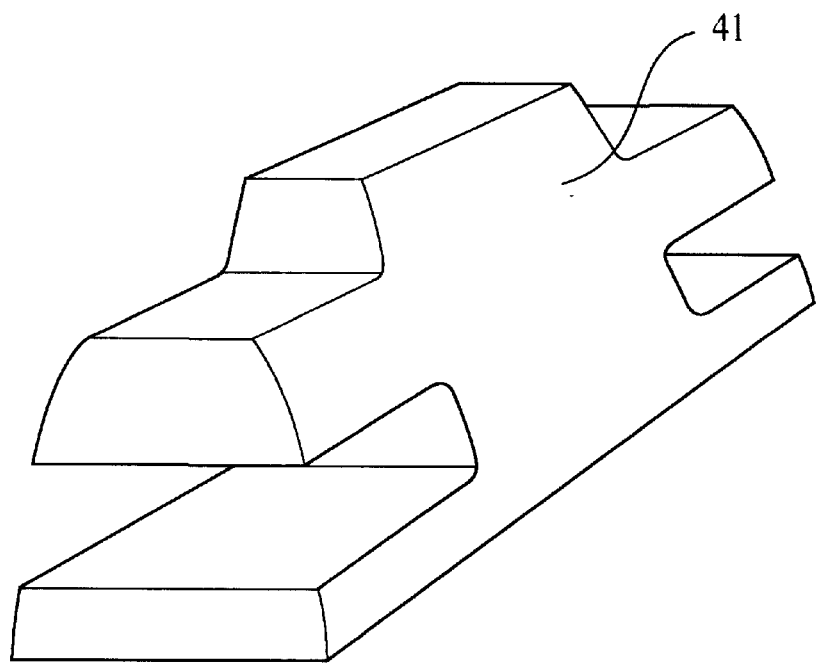
FIGS. 4A–4D are perspective views of gear teeth embodying third, fourth, fifth and sixth embodiments of the invention, respectively.
Figure 4B:
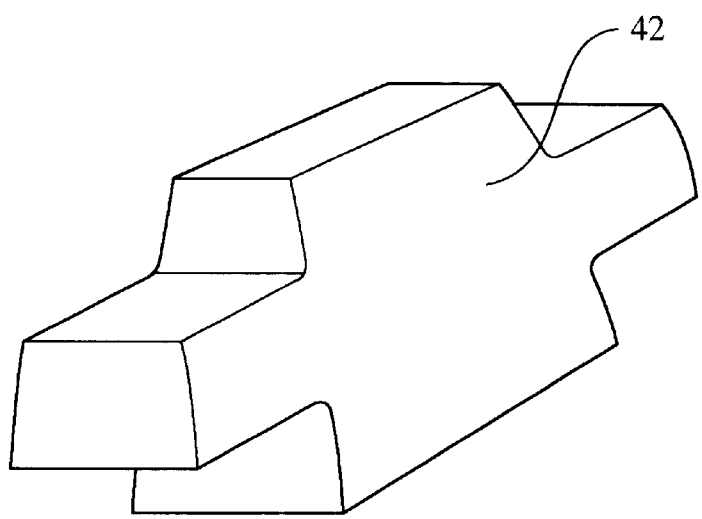

Tooth 41 in FIG. 4A has the face width reduced in multiple places along the tooth height. A gear having teeth of this shape may be used as an alternative to tooth 21 in order to obtain the benefits of the invention by modifying only one member of a gear pair. Similarly, a gear having teeth similar to tooth 42 in FIG. 4B may be used in applications where only one of the two mating gears is modified, and where the weight of the gear is to be minimized.

Figure 4C:
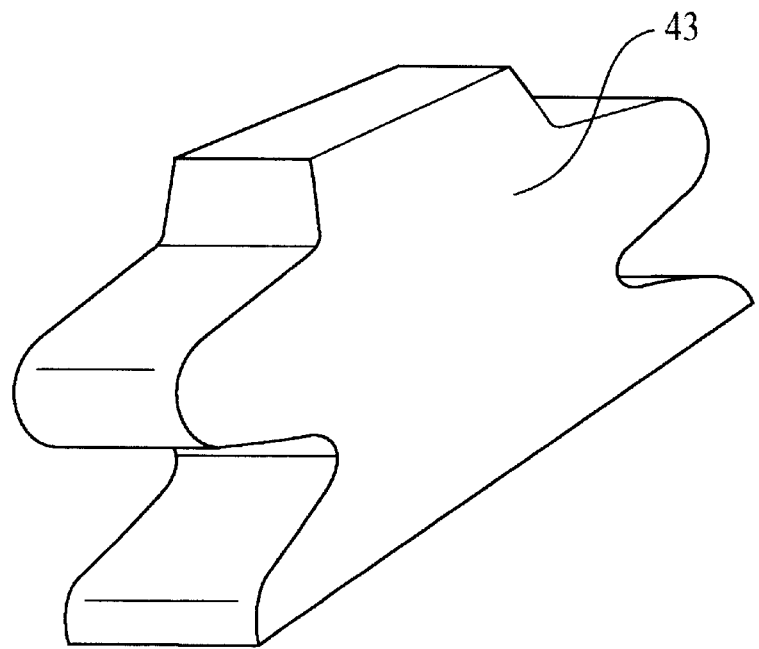
Figure 4D:
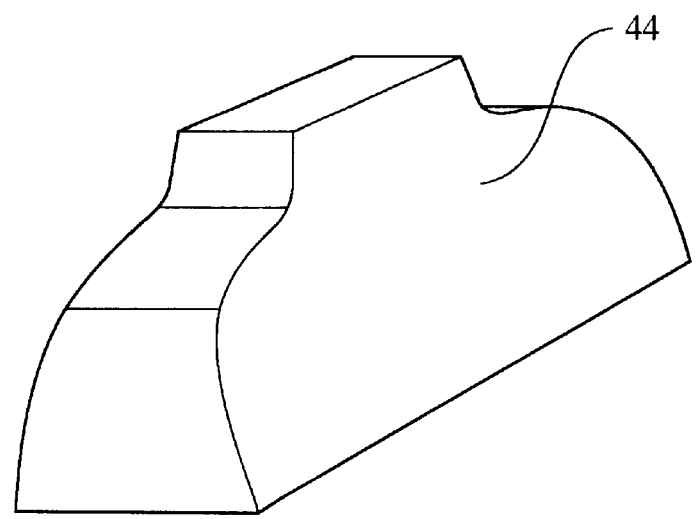

Previous examples of the invention illustrated above have shown distinct discontinuities between sections along the tooth height having different face widths. The main reason for this is drawing clarity. In practice, the transition between two different face widths can have any number of forms. Along this line, instead of using just two different face widths, as has been shown above, one can use an unlimited number of different face widths. Tooth 43 in FIG. 4C is one example of a gear tooth embodying the current invention where the face width varies continuously as a function of roll angle or tooth height. Tooth 44 in FIG. 4D is similar to tooth 21, except that the face width changes gradually as a function of roll angle or tooth height.

As is evident by some of the embodiments thus disclosed, an inherent advantage is a decrease in weight of the gear afforded by the material removal necessary in achieving the required face widths at different roll angles. It is also possible to remove additional material for the purpose of reducing weight without significantly affecting gear noise or power density.

While for simplicity the above examples have shown the current invention as applied to parallel axis spur gears, this concept can be implemented in a variety of other gear forms, including helical, bevel, spiral bevel, and herringbone gears. In all of these cases, the same general strategy of changing the face widths at specific roll angles can be used to achieve the desired mesh stiffness characteristic. While this implementation can be considered obvious for someone skilled in the art for bevel gears, implementation for gears with a helix or spiral angle may require some changes in other tooth dimensions. In particular, a reasonable embodiment of the current invention may only be possible with the selection of a particular helix or spiral angle, in combination with the addendum heights of the two mating gears. In addition, the changes in face width may occur in either the axial direction or the direction of the lines of contact.

The best method for determining the optimum face width at each roll angle is to first calculate mesh deflection at each roll angle for a conventional gear pair design at all operating loads. Next, an optimization metric based on the application requirements is determined. Then, the gear tooth face widths at each roll angle are calculated and changed to reduce mesh stiffness variation while still meeting the optimization metric, which will have the effect of reducing gear noise, increasing power density, and decreasing weight. The gear with modified face widths is evaluated for acceptable stresses, load-life performance, and acceptable operation. This procedure can be iterated until an optimized solution is determined.

Another advantage with the current invention, specifically in contrast with gears requiring topological modifications, is the simplicity of manufacture, which translates into reduced implementation costs. Gears embodying the current invention can be made using any existing process that is used to manufacture gears, including hobbing, shaping, shaving, grinding, skiving, honing, rolling, lapping, etc. In addition, gears embodying the invention can be made with any existing cutting tools, including hobs, shaper cutters, shaving cutters, grinding wheels, etc. The only portion of the manufacturing process that has to be changed is the design and fabrication of the gear blank.

Figures 5A, 5B:
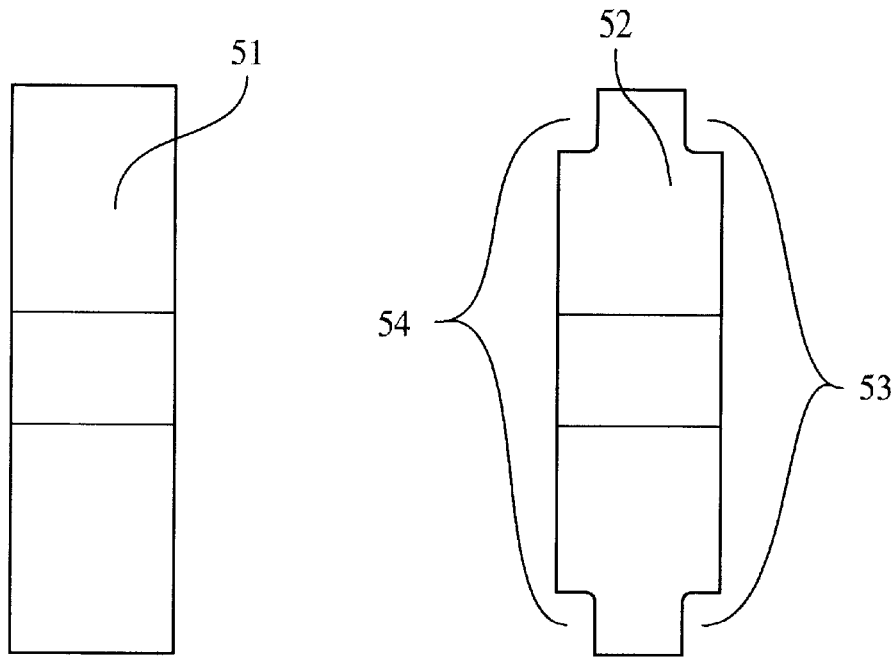
FIG. 5A is a side view of a conventional gear blank.
FIG. 5B is a side view of a gear blank according to the present invention.

FIG. 5A shows an example of a conventional gear blank 51, and FIG. 5B shows a sample gear blank using the current invention 52. The only difference between the two blanks is that material has been removed in the areas (53 and 54) where it is desired to have a reduced face width. This material removal can be accomplished using a standard lathe with standard cutting tools. This blank preferably has at least two different face widths along the radial axis and can have a variety of shapes based on the particular embodiment of the invention. Once this new blank is manufactured, the gear teeth can be produced using any existing cutting tool and manufacturing process as described above. In many cases, when replacing an existing set of gears with a set embodying the current invention, only the gear blank needs to be changed.

As with most conventional gears, it is recommended to include some lead crowning, to reduce end loading brought about by misalignment in an assembled system. This crowning curve would be constant through the height of the tooth. For the sections that have a reduced face width, the amount of crowning will be inherently smaller, yet it should be sufficient to prevent loading at the edges of the portions with reduced face widths.

Figure 6:
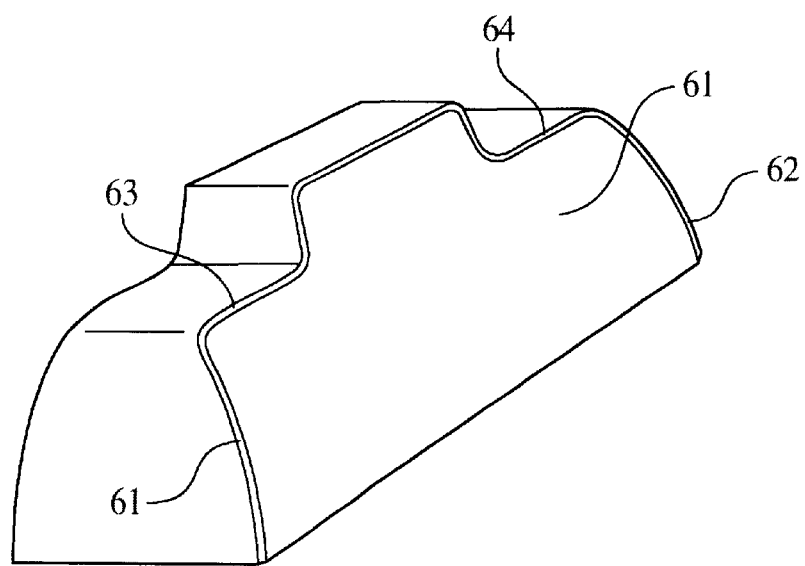
FIG. 6 is a perspective view of a gear tooth embodying a seventh embodiment of the present invention having chamfered edges.

It is also possible to add a chamfer or edge break onto gears embodying the current invention, as is done with many conventional gears, in order to reduce the likelihood of nicks or burrs brought about by general manufacturing or handling processes. The gear tooth (61) in FIG. 6 is substantially the same tooth as 21 in FIG. 2, except that chamfers have been added to all of the edges of the tooth. While putting chamfers on edges 61 and 62 should be fairly straightforward, the chamfers on edges 63 and 64 can be added by modifying the travel path on any conventional chamfering machine.

It should be further noted that a gear made in accordance with this invention is significantly different from a gear with conventional modifications such as edge chamfering and tip cornering. Specifically, these two forms of modifications to the tooth shape differ in both the purpose and the extent of modification. Edge chamfering and tip cornering is designed into a gear tooth to avoid unwanted contact between two mating teeth. Such contact may occur in operation due to misalignment or manufacturing errors. By chamfering the edges and cutting the corners, contact is avoided on these extreme surfaces and forced onto the body of the tooth. Furthermore, edge chamfering and tip cornering involve only a slight removal of material, usually on the order of thousandths of an inch. This slight change in gear shape does not significantly affect the stiffness of the tooth. In fact, gears made in accordance with this invention may also include edge chamfering and tip cornering for these conventional reasons.

As a final note, gears embodying this invention may also use "differential crowning", to provide an effective compromise between an increase in contact pressures and improved performance across all loads.

Since many changes and variations of the disclosed embodiment of the invention may be made without departing from the inventive concept, it is not intended to limit the invention otherwise than as required by the appended claims.

What is claimed is:

1. A gear having a plurality of teeth, each tooth having a tooth height extending from a base to a tip of said tooth, at least one tooth having at least two different face widths at distinct tooth height positions wherein the face width at the tip of said at least one tooth is smaller than the face width at the base of said at least one tooth and said face width at the tip of said at least one tooth includes the centerline of said face width at the base of said at least one tooth such that the tooth stiffness is modified for at least one of said teeth of said gear.

2. A gear according to claim 1 wherein said tooth stiffness is decreased for at least one of said teeth of said gear.

3. A gear according to claim 1 wherein said tooth stiffness is increased for at least one of said teeth of said gear.

4. A gear according to claim 1 wherein on said at least one tooth, the centerline of a first face width at one tooth height is different from the centerline of a second face width at a different tooth height position of said at least one tooth.

5. A gear according to claim 1, wherein said at least one tooth has chamfered edges.

6. A gear according to claim 1, wherein said at least one tooth has constant lead crowning.

7. A gear according to claim 1, wherein said at least one tooth has "differential crowning".

8. A gear according to claim 1, wherein said at least one tooth has at least one relief selected from the group consisting of tip relief and root relief.

9. A gear comprising a plurality of teeth, each tooth having a tooth height extending from a base to a tip of said tooth, at least one tooth having at least two different face widths at distinct tooth height positions such that the tooth stiffness is modified for at least one of said teeth of said gear, wherein the face width of said at least one tooth varies continuously along the tooth height.

10. A gear comprising a plurality of teeth, each tooth having a tooth height extending from a base to a tip of said tooth, at least one tooth having at least two different face widths at distinct tooth height positions such that the tooth stiffness is modified for at least one of said teeth of said gear, wherein the face width of said at least one tooth is changed at a plurality of nonadjacent height positions.

11. A pair of gears having mating teeth, each of said teeth having a tooth height extending from a base to a tip of each of said teeth, wherein at least one tooth on at least one of said gears has at least two different face widths at distinct tooth height positions wherein the face width at the tip of said at least one tooth is smaller than the face width at the base of said at least one tooth and said face width at the tip of said at least one tooth includes the centerline of said face width at the base of said at least one tooth such that tooth pair stiffness for said pair is altered.

12. A pair of gears having mating teeth, each of said teeth having a tooth height extending from a base to a tip of each of said teeth, wherein at least one tooth on at least one of said gears has at least two different face widths at distinct tooth height positions wherein mesh stiffness variation is reduced.

13. A pair of gears according to claim 11 or 12 wherein mesh stiffness is decreased in the portion of the mesh cycle having the greater number of tooth pairs in contact.

14. A pair of gears according to claim 11 or 12 wherein mesh stiffness is increased in the portion of the mesh cycle having the lesser number of tooth pairs in contact.

15. A pair of gears according to claim 11 or 12 wherein on said at least one tooth the centerline of a first face width at one tooth height position is different from the centerline of a second face width at a different tooth height position.

16. A pair of gears according to claim 11 or 12 wherein the face width of said at least one tooth is changed at multiple tooth height positions.

17. A pair of gears according to claim 11 or 12 wherein said at least one tooth has chamfered edges.

18. A pair of gears according to claim 11 or 12 wherein said at least one tooth has constant lead crowning.

19. A pair of gears according to claim 11 or 12 wherein said at least one tooth has "differential crowning".

20. A pair of gears according to claim 11 or 12 wherein said at least one tooth has at least one relief selected from the group consisting of tip relief and root relief.

21. A pair of gears having a plurality of teeth, each tooth having a tooth height extending from a base to a tip of said tooth, at least one tooth having at least two different face widths at distinct tooth height positions such that the tooth pair stiffness for said pair is altered, wherein the face width of said at least one tooth varies continuously along the tooth height.

22. A pair of gears having mating teeth, wherein the face width of at least one tooth is modified such that the tooth stiffness is changed thereby reducing mesh stiffness variation such that noise is reduced and power density is increased.

23. A gear having a plurality of teeth, each tooth having a tooth height extending from a base to a tip of said tooth, at least one tooth having at least two different face widths at distinct tooth height positions such that the tooth stiffness is modified for at least one of said teeth of said gear, wherein said at least one tooth has "differential crowning".

24. A pair of gears having mating teeth, each of said teeth having a tooth height extending from a base to a tip of each of said teeth, wherein at least one tooth on at least one of said gears has at least two different face widths at distinct tooth height positions such that tooth pair stiffness for said pair is altered wherein at least one tooth has "differential crowning".

25. A pair of gears according to claim 24, wherein the face width of said at least one tooth is modified such that the tooth stiffness is changed thereby reducing mesh stiffness variation such that noise is reduced and power density is increased.

26. A gear having a plurality of teeth, each tooth having a tooth height extending from a base to a tip of said tooth, at least one tooth having at least two different face widths at distinct tooth height positions wherein the face width at the tip of said at least one tooth is smaller than the face width at the base of said at least one tooth and said face width at the tip of said at least one tooth includes the centerline of said face width at the base of said at least one tooth.

27. A pair of gears having mating teeth, each of said teeth having a tooth height extending from a base to a tip of each of said teeth, wherein at least one tooth on at least one of said gears has at least two different face widths at distinct tooth height positions such that tooth pair stiffness for said pair is altered wherein the face width of said at least one tooth varies continuously along the tooth height.

28. A gear having a plurality of teeth, each tooth having a tooth height extending from a base to a tip of said tooth, wherein the face width of at least one tooth of said teeth varies continuously along the tooth height.

29. A gear having a plurality of teeth, each tooth having a tooth height extending from a base to a tip of said tooth, wherein the face width of said at least one tooth is changed at a plurality of nonadjacent height positions.

30. A method for reducing the self-excited component of dynamic load of a gear pair, said method comprising the steps of:
  a. determining the mesh stiffness of a conventional gear pair through a full mesh cycle at all operating loads,
  b. determining an optimization metric based on the application requirements,
  c. calculating modified face widths at each tooth height to modify the tooth pair stiffness characteristic through a full mesh cycle to reduce mesh stiffness variation while still meeting said optimization metric,
  d. providing a gear pair design in which at least one gear of said gear pair has at least one tooth having said modified face widths.

31. A method for manufacturing a gear having a plurality of teeth with different face widths at different tooth heights, each of said teeth having a tooth height extending from a base to a tip of each of said teeth, said method comprising the steps of:
  a. providing a gear blank with at least two different widths along the radial axis, and
  b. fabricating said plurality of teeth from said gear blank such that each of said plurality of teeth has at least two different face widths at distinct tooth height positions wherein the face width at the tip of each of said plurality of teeth is smaller than the face width at the base of each of said plurality of teeth and said face width at the tip of each of said plurality of teeth includes the centerline of said face width at the base of each of said plurality of teeth such that the tooth stiffness has been modified for said gear teeth.

32. A method for manufacturing a gear having a plurality of teeth with different face widths at different tooth heights, each of said teeth having a tooth height extending from a base to a tip of each of said teeth, said method comprising forming said plurality of teeth such that each of said plurality of teeth has at least two different face widths at distinct tooth height positions wherein the face width at the tip of each of said plurality of teeth is smaller than the face width at the base of each of said plurality of teeth and said face width at the tip of each of said plurality of teeth includes the centerline of said face width at the base of each of said plurality of teeth such that the tooth stiffness has been modified for said gear teeth.

* * * * *